United States Patent
Brillon et al.

(10) Patent No.: US 10,431,028 B2
(45) Date of Patent: Oct. 1, 2019

(54) METHOD OF DEFENSE AGAINST AN ATTACK RELAY ACTION ON A REMOTE ACTIVATION OF A FUNCTION PRESENT IN AN AUTOMOTIVE VEHICLE

(71) Applicants: Continental Automotive France, Toulouse (FR); Continental Automotive GmbH, Hannover (DE)

(72) Inventors: Alain Brillon, Villeneuve Tolosane (FR); Alex Fournie, Ste Foy de Peyrolières (FR); Isabelle Verdon, Cornebarrieu (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/318,415

(22) PCT Filed: Jul. 25, 2017

(86) PCT No.: PCT/FR2017/052061
§ 371 (c)(1),
(2) Date: Jan. 17, 2019

(87) PCT Pub. No.: WO2018/020135
PCT Pub. Date: Feb. 1, 2018

(65) Prior Publication Data
US 2019/0244457 A1     Aug. 8, 2019

(30) Foreign Application Priority Data
Jul. 29, 2016 (FR) ...................................... 16 57356

(51) Int. Cl.
*G07C 9/00* (2006.01)
*B60R 25/24* (2013.01)

(52) U.S. Cl.
CPC .......... *G07C 9/00309* (2013.01); *B60R 25/24* (2013.01); *G07C 2009/00555* (2013.01);
(Continued)

(58) Field of Classification Search
None
See application file for complete search history.

(56) References Cited

U.S. PATENT DOCUMENTS 5,723,911 A * 3/1998 Glehr ..................... B60R 25/24
180/287
8,195,422 B2 * 6/2012 Wilcox ................ A61K 31/365
342/118

(Continued)

FOREIGN PATENT DOCUMENTS

| DE | 29714999 U1 | 11/1997 |
| EP | 1429295 B1 | 8/2010 |
| FR | 2843240 A1 | 2/2004 |

OTHER PUBLICATIONS

English translation of the Written Opinion for International Application No. PCT/FR2017/052061, dated Oct. 18, 2017—4 pages.
(Continued)

*Primary Examiner* — Curtis J King
(74) *Attorney, Agent, or Firm* — RatnerPrestia

(57) ABSTRACT

A method of defense against an attack relay action on a remote activation of a function present in an automotive vehicle. The attack relay receives a frame of electromagnetic waves emitted by the activation module and retransmits it to the at least one activation device, nevertheless out of range of emission of the activation module, which dispatches a response frame of electromagnetic waves to the activation module. There is performed, out of range of emission of the activation module, an at least partial interception of a retransmitted frame of electromagnetic waves originating from the attack relay in the direction of the activation device.

(Continued)

An at least partial destruction of the retransmitted frame at the activation device and/or of the response frame of the activation device toward the activation module rendering the activation of the function inoperative is performed.

13 Claims, 1 Drawing Sheet

(52) U.S. Cl.
CPC .............. *G07C 2009/00769* (2013.01); *G07C 2209/63* (2013.01)

(56) References Cited

U.S. PATENT DOCUMENTS

| | | | | |
|---|---|---|---|---|
| 9,961,968 | B1* | 5/2018 | Mulcahy | G07C 9/00 |
| 10,235,823 | B1* | 3/2019 | Saleh | G07C 9/00309 |
| 2003/0043023 | A1* | 3/2003 | Perraud | G06K 7/0008 340/10.1 |
| 2003/0222757 | A1* | 12/2003 | Ghabra | B60R 25/24 340/5.72 |
| 2004/0137877 | A1* | 7/2004 | Crowhurst | G07C 9/00182 455/411 |
| 2004/0174245 | A1 | 9/2004 | Brillon | |
| 2006/0033608 | A1* | 2/2006 | Juels | G06K 19/07336 340/10.1 |
| 2006/0083406 | A1* | 4/2006 | Ishimura | B60R 25/24 382/106 |
| 2006/0255909 | A1* | 11/2006 | Pavatich | B60R 25/24 340/5.64 |
| 2006/0273176 | A1* | 12/2006 | Audebert | G06K 19/07336 235/451 |
| 2007/0057791 | A1* | 3/2007 | Karjoth | G06K 7/0008 340/572.1 |
| 2007/0075145 | A1 | 4/2007 | Arendonk | |
| 2009/0006032 | A1* | 1/2009 | Wilcox | G01S 13/825 702/176 |
| 2009/0041241 | A1* | 2/2009 | Dobyns | H04B 5/0031 380/252 |
| 2009/0053996 | A1* | 2/2009 | Enguent | G06K 19/0701 455/26.1 |
| 2009/0081943 | A1* | 3/2009 | Dobyns | H04K 3/42 455/1 |
| 2009/0258592 | A1* | 10/2009 | Huang | G06K 19/07336 455/1 |
| 2013/0078906 | A1* | 3/2013 | Ben Hamida | H04K 3/22 455/7 |
| 2013/0116964 | A1* | 5/2013 | van Roermund | G06K 7/0008 702/141 |
| 2014/0375423 | A1* | 12/2014 | Lagabe | B60R 16/02 340/5.61 |
| 2015/0222658 | A1* | 8/2015 | Kim | H04L 63/1466 726/22 |
| 2016/0200291 | A1* | 7/2016 | Kim | B60R 25/30 701/2 |
| 2016/0280184 | A1* | 9/2016 | Katou | B60R 25/24 |
| 2017/0161974 | A1* | 6/2017 | Kim | G07C 9/00007 |
| 2017/0327083 | A1* | 11/2017 | Verkin | G01D 5/20 |
| 2017/0346852 | A1* | 11/2017 | Chhabra | H04L 63/0435 |
| 2018/0056936 | A1* | 3/2018 | Parasurama | B60R 25/245 |
| 2018/0130275 | A1* | 5/2018 | Odejerte, Jr. | H04W 4/80 |
| 2018/0194321 | A1* | 7/2018 | Zank | G07C 9/00309 |
| 2018/0374290 | A1* | 12/2018 | Bjorkengren | B60R 25/24 |
| 2019/0012859 | A1* | 1/2019 | Leonhardt | G07C 9/00309 |
| 2019/0026483 | A1* | 1/2019 | Boireau | G06F 21/35 |
| 2019/0044951 | A1* | 2/2019 | Zivkovic | H04L 63/107 |
| 2019/0126890 | A1* | 5/2019 | Song | B60R 25/241 |
| 2019/0161058 | A1* | 5/2019 | Lin | B60R 25/24 |
| 2019/0180542 | A1* | 6/2019 | Geier | G07C 9/00309 |

OTHER PUBLICATIONS

International Search Report and Written Opinion for International Application No. PCT/FR2017/052061, dated Oct. 18, 2017—6 pages.

* cited by examiner

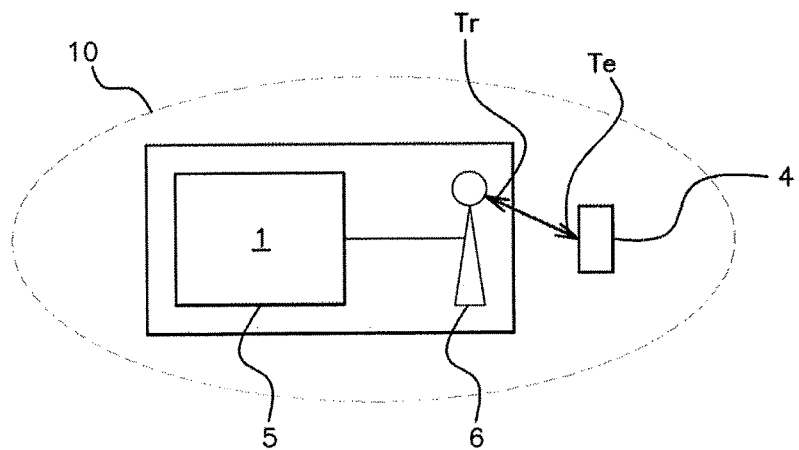
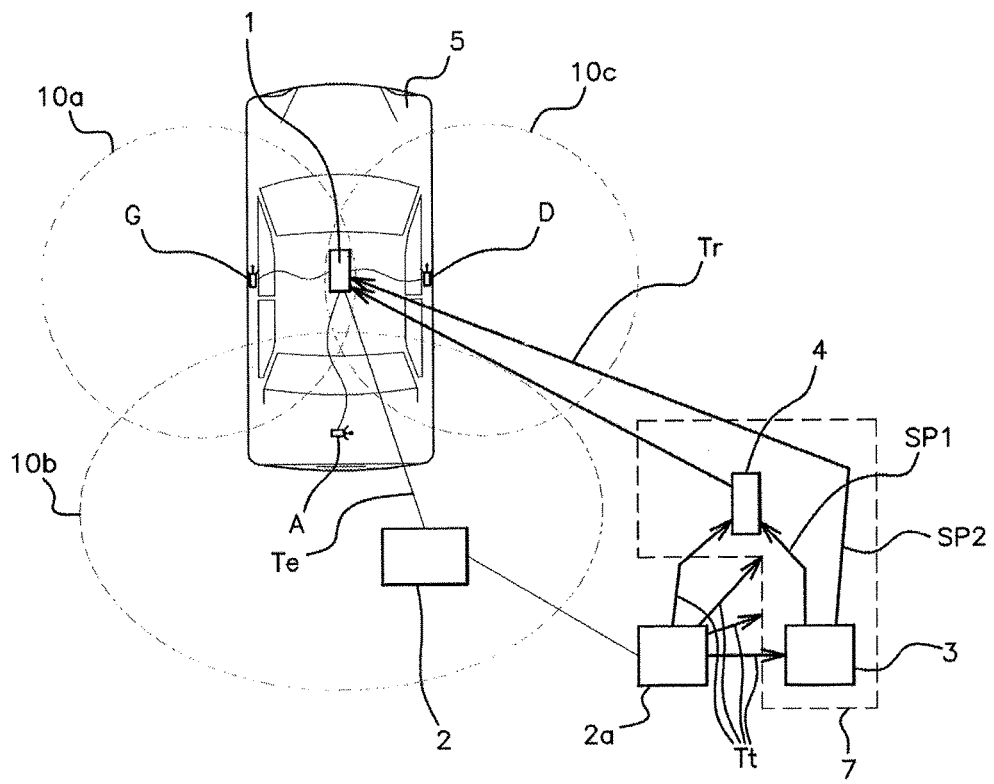

METHOD OF DEFENSE AGAINST AN ATTACK RELAY ACTION ON A REMOTE ACTIVATION OF A FUNCTION PRESENT IN AN AUTOMOTIVE VEHICLE

CROSS REFERENCE TO RELATED APPLICATIONS

This application is the U.S. National Phase Application of PCT International Application No. PCT/FR2017/052061, filed Jul. 25, 2017, which claims priority to French Patent Application No. 1657356, filed Jul. 29, 2016, the contents of such applications being incorporated by reference herein.

FIELD OF THE INVENTION

The present invention relates to a method of defense against an attack relay action on a remote activation of a function present in an automotive vehicle.

BACKGROUND OF THE INVENTION

Methods of remote activation of a function present in an automotive vehicle are known. These methods are known under the phrase method of accessing the vehicle and/or starting the vehicle of the "hands-free" type. In such methods, the person entitled to perform the activation, frequently the driver of the vehicle, possesses an electronic key or an electronic fob as activation means performing the unlocking or the locking of the openable panels and/or being able to allow the starting of the vehicle corresponding thereto with an activation module.

An exemplary system for activation by detecting a position of an activation means at a predetermined distance from a vehicle is illustrated in FIG. 1. Such a system is partially integrated into a vehicle 5 by an activation module 1 communicating remotely with an activation means 4 exhibiting in this example the form of a fob for "hands-free" access to the vehicle 5.

The activation system comprises at least one omnidirectional antenna 6 mounted on the vehicle 5 and not only at the rear part of the vehicle. This antenna 6 is coupled to said activation module 1 and configured, on the one hand, to emit, preferably periodically, a frame of electromagnetic waves Te inducing an electromagnetic field in an electromagnetic emission space 10 around the vehicle 5 and, on the other hand, to receive electromagnetic waves in response Tr from the activation means 4.

When an activation means 4 associated with the vehicle 5 enters said emission space and receives at least one of the frames of electromagnetic waves emitted by the antenna 6, it can determine, for example with the aid of an identification code of the vehicle 5, that it is in the space of emission of an antenna 6 or of the antennas coupled to an activation module 1 with which it is remotely associated.

For a passive access and engine startup system, a method of attack called attack relay has been developed by criminals who are not authorized to perform the activation of a function present in the vehicle. In order for example to perform a startup, such a method of attack allows the activation module to be made to believe that said at least one activation means is located inside the vehicle whilst the apparatus simulating said at least one activation means and the criminal manipulating it are outside the vehicle.

FIG. 2 gives an example of attack relay. The criminal positions an attack relay with a reception module 2 in the or one of the detection zones around the automotive vehicle, whilst said at least one activation means 4 is not situated in this zone or one of these zones and an emission module 2a out of range of emission of the activation module 1. The attack relay 2, 2a receives a frame of electromagnetic waves emitted Te by the activation module 1 of the vehicle 5. This attack relay 2, 2a retransmits to said at least one activation means 4 this frame of electromagnetic waves emitted Te in the form of a retransmitted electromagnetic frame of waves Tt.

This transmission is effected with a very powerful signal, advantageously a divergent beam of powerful signals, it being given that the criminal does not know exactly where the activation means 4 is situated, for example in a residence 7 which the owner of the automotive vehicle 5 has entered.

Said at least one activation means 4 receives the retransmitted electromagnetic frame of waves Tt as if it were emitted directly by the activation module 1. In return, said at least one activation means 4 dispatches a response frame of electromagnetic waves Tr to the activation module 1 for the activation of the function present in the automotive vehicle. Indeed, if the activation module 1 were not able to correspond in emission with said at least one activation means 4 then outside of the emission zone, said at least one activation means 4 is on the other hand able to effectively re-emit toward the activation module 1, the type of electromagnetic response waves re-emitted by said at least one activation means 4 being of longer range, being for example radiofrequency waves, than the electromagnetic waves emitted by the activation module 1, for example low-frequency waves.

To defend against an attack relay, several solutions have been proposed. The first solution envisages that said at least one mobile activation means belonging to the person entitled to activate the function in the automotive vehicle be furnished with a motion sensor. When it is noted that said at least one activation means has not been moved for a predetermined duration, said at least one activation mean deactivates automatically. This solution is relatively expensive and exhibits the disadvantage of not being able to be fitted on already existing activation means.

It has also been proposed to keep an activation means stowed away in a shielded casing, when a user of the activation means knows that he will no longer be going to use his activation means for some unspecified period of time. The shielding allows said at least one means of activation to no longer receive any frame of electromagnetic waves emitted by the activation module, notably a frame of electromagnetic waves retransmitted by an attack relay. This solution has the disadvantage for the user of being very constraining by requiring him to stow away and to take out his activation means according to circumstances.

In addition, these solutions currently implemented against an attack relay do not make it possible to guarantee 50% protection against criminal activation.

SUMMARY OF THE INVENTION

The problem underlying the present invention is to design a method and a device for defending against criminal remote activation of a function present in an automotive vehicle, this criminal activation being termed relay, the defense method and device having to be simple to implement and effective.

To this effect, an aspect of the present invention relates to a method of defense against an attack relay action on a remote activation of a function present in an automotive vehicle, the activation being effected between at least one activation means belonging to a person entitled to operate this activation and an activation module present in the vehicle by emission and reception of electromagnetic waves between said at least one activation means and the activation module, the attack relay action consisting in receiving a frame of electromagnetic waves emitted by the activation module and in retransmitting it to said at least one activation means then being in a zone out of range of emission of the activation module, said at least one activation means, after reception of a frame of electromagnetic waves retransmitted by the attack relay, then re-emitting a response frame of electromagnetic waves to the activation module for the activation of the function, noteworthy in that there is performed, in a zone out of range of emission of the activation module, an at least partial interception of the frame of electromagnetic waves retransmitted from the attack relay in the direction of said at least one activation means, an at least partial destruction of the frame of electromagnetic waves retransmitted to said at least one activation means and/or of the response frame of electromagnetic waves from said at least one activation means to the activation module, this destruction rendering the activation of the function inoperative.

The technical effect is to be able to use a defense device, advantageously in the form of a defense housing, which can at least partially destroy the communication between the attack relay and said at least one activation means or the communication between said at least one activation means and the activation module after reception of a frame of electromagnetic waves retransmitted by the attack relay similar to a frame of electromagnetic waves emitted by the activation module. The defense device can be separate from the activation means, therefore not requiring a modification of this activation means and therefore applicable in association with any already existing activation means.

There are no particular positioning conditions to be complied with between the defense device and said at least one activation means other than to leave them in emission range of one another, this being advantageous relative to a shielding casing, the latter requiring that the activation means be inserted in the shielding casing.

As the interception is effected out of range of emission of the activation module present in the automotive vehicle, it is certain that an intercepted frame of electromagnetic waves similar to a frame of electromagnetic waves emitted by the activation module originates from an attack relay.

When there are several activation means in one and the same environment within range of retransmission of the attack relay, for example a frequently used activation means and additional activation means ensuring the replacement of the activation means used for redundancy in case of loss or of malfunction of this activation means, the interception must be effected on all the activation means present in this environment and able to receive the frame of electromagnetic waves retransmitted by the attack relay. This is the case for example for electronic keys or electronic fobs kept stowed away in a residence.

Advantageously, the interception of the retransmitted frame of electromagnetic waves is effected at the start of a frame. This leaves time to perform the at least partial destruction, this being very advantageous when the at least partial destruction is performed on the frame of electromagnetic waves retransmitted from the attack relay to the activation means.

Advantageously, when the at least partial destruction is effected on the frame of electromagnetic waves retransmitted to said at least one activation means, this at least partial destruction pertains to an end portion of the retransmitted frame of electromagnetic waves.

Advantageously, the at least partial reception of a retransmitted frame of electromagnetic waves is effected by a defense housing with emission by the defense housing of at least one signal of at least partial destruction of a retransmitted and/or response frame of electromagnetic waves. Destruction is therefore effected by jamming of the retransmitted and/or response frame of electromagnetic waves by emission of a destruction signal by the defense housing. This jamming can be effected on the retransmitted frame of electromagnetic waves, on the response frame of electromagnetic waves or on both at the same time.

Advantageously, the defense housing is independent of said at least one activation means and emits a divergent beam of signals of at least partial destruction on the retransmitted frame of electromagnetic waves and/or on the response frame of electromagnetic waves.

The mobility of the defense housing makes it possible to associate the defense housing with any type of already existing activation means without modifying these activation means. Emitting the destruction signals in several directions leaves a freedom of positioning of the activation means with respect to the defense housing or vice versa. The response frame of electromagnetic waves is more difficult to destroy than the retransmitted frame of electromagnetic waves on account of possible reflections of the response frame of electromagnetic waves before it reaches the activation module. The defense method according to an aspect of the invention does not seek to know how many activation means are present in the environment, but destroys all the possible frames.

Advantageously, the frame of electromagnetic waves emitted by the activation module and the frame of electromagnetic waves retransmitted by the attack relay to said at least one activation means are frames of low-frequency waves and the response frame of electromagnetic waves in reply by said at least one activation means to the activation module is a frame of radiofrequency waves, said at least one signal of at least partial destruction of a retransmitted and/or response frame of electromagnetic waves being respectively low-frequency or radiofrequency.

Advantageously, said at least one destruction signal is a jamming signal interfering respectively with at least one portion of the retransmitted frame of electromagnetic waves and/or of the response frame of electromagnetic waves.

Advantageously, the defense housing is mobile and, when the defense housing is placed within range of emission of the activation module, the defense housing is deactivated by no longer emitting a destruction signal. It could indeed happen that the defense housing, within range of the activation module, regards the frame of electromagnetic waves emitted by the activation module to be like a frame of electromagnetic waves retransmitted by an attack relay and regrettably does not prevent activation of the function present in the vehicle. This is avoided by deactivation of the defense housing. A mobile defense housing exhibits the great advantage of being transported with the one or more activation means to various locations, for example of being carried by the owner of the one or more activation means into different residences.

Advantageously, there is performed an initial step of learning of the defense housing with respect to the activation module present in a specific automotive vehicle, this initial step consisting in placing within range of emission of the activation module the defense housing in a mode of detection of frames of electromagnetic waves without at least partial destruction of the intercepted frames, in making the activation module emit an emitted frame of electromagnetic waves specific to this activation module, in making the defense housing recognize this emitted frame of electromagnetic waves as being specific to the activation module and in making the defense housing store at least the start of this emitted frame of electromagnetic waves and, when the defense housing is placed out of range of emission of the activation module, the at least partial destruction of an intercepted frame of electromagnetic waves at said at least one activation means and/or of a response frame of electromagnetic waves from said at least one activation means to the activation module is effected after comparison and similarity of the stored start of the frame of electromagnetic waves emitted by the activation module with a start of the intercepted frame.

This makes it possible to dedicate a defense housing specifically to an automotive vehicle and its activation module integrated in the automotive vehicle. This allows the defense housing to recognize a frame of electromagnetic waves emitted by the specifically associated activation module and to not perform one or more regrettable destructions after interception by the defense housing of frames of electromagnetic waves emitted by other activation modules for automotive vehicles other than the vehicle associated with the defense housing.

It is therefore possible to have a standard defense housing for all automotive vehicles and to dedicate this defense housing specifically to a vehicle during a learning step. The learning procedure can be effected on several vehicles for a person or couple having several vehicles with one or more functions remotely activatable by activation of the hands-free type. One and the same defense housing will thus be able to protect several vehicles.

The learning procedure can thus be supplemented with a verification in proximity to the vehicle. If the procedure has run properly, the user can no longer access or start his vehicle. This verification guarantees correct learning of the housing.

Advantageously, there is performed a verification of a positioning of the defense housing out of range of emission of the activation module at the start of the method. This verification is advantageous so as to be certain that the defense housing will intercept only frames of electromagnetic waves retransmitted by an attack relay.

An aspect of the invention relates to a defense housing for defending against an attack relay, the attack relay exhibiting means for receiving a frame of electromagnetic waves emitted by the activation module and means for transmitting a retransmitted frame of electromagnetic waves to said at least one activation means, noteworthy in that it implements such a method, the defense housing exhibiting at least one antenna for receiving the frame of electromagnetic waves retransmitted by the attack relay, means for generating at least one at-least-partial-destruction signal and at least one antenna for emitting the signal of at least partial destruction of the frame of electromagnetic waves retransmitted to said at least one activation means and/or of the response frame of electromagnetic waves by said at least one activation means to the activation module.

Such a defense housing exhibits a compact form and can be associated with all the activation systems already in circulation and notably with their activation means without changing these activation means. There is no constraint of positioning of the activation means with respect to the defense housing as long as the defense housing is within range of emission of the activation means for the destruction of the retransmitted frame of electromagnetic waves and of the activation module for the destruction of the response frame of electromagnetic waves.

The defense housing is not bound to a single activation means. On the contrary, a single defense housing can be associated with all the activation means associated with the same activation module. Such a housing can be implemented in specific countries while its application can be suspended in other countries, the activation means remaining the same, it being given that there is no mechanical link between defense housing and activation means.

An aspect of the invention also relates to an assembly of an automotive vehicle and of at least one activation means noteworthy in that it comprises such a defense housing. The defense housing is then associated with a set of activation means and can ensure a defense against the attack relay for each of these activation means.

BRIEF DESCRIPTION OF THE DRAWINGS

Other features, aims and advantages of aspects of the present invention will become apparent upon reading the detailed description that will follow and upon examining the appended drawings, given by way of nonlimiting example and in which:

FIG. 1 is a schematic representation of a system for remote activation of the hands-free type of a function present in an automotive vehicle, this activation system being used in an authorized manner in this figure, and FIG. 2 is a schematic representation of a view from above of an automotive vehicle endowed with a system for remote activation of the hands-free type of a function present in the vehicle, an attack relay having been implemented by a criminal and nullified by a method and a device for defending against an attack relay in accordance with an aspect of the present invention.

DETAILED DESCRIPTION OF THE PREFERRED EMBODIMENTS

To this effect, on referring to FIG. 2, an aspect of the present invention relates to a method of defense against an attack relay action 2, 2a on a remote activation of a function present in an automotive vehicle 5. In a customary and authorized manner, the activation is effected between an activation means 4 belonging to a person entitled to operate this activation and an activation module 1 present in the vehicle 5 by emission, and reception of electromagnetic waves between the activation means 4 and the activation module 1. The activation means 4 is then within range of emission of the activation module 1, that is to say that electromagnetic waves emitted by the activation module 1 while forming a frame can reach the activation means 4.

The activation module 1 is frequently in the form of an electronic unit endowed with or associated with means for emitting and receiving electromagnetic waves. In FIG. 2, without this being limiting, three omnidirectional antennas G, D, A coupled to the activation module 1 are envisaged as means for emitting and receiving electromagnetic waves. It is possible to use one antenna or several antennas. The use of five antennas may be preferred but is likewise not limiting.

In what was described previously, the antennas G, D, A are used for access. Alternatively or additionally, it is possible to equip the vehicle with interior antennas which are used preferentially for starting.

The activation module 1 therefore dispatches a frame of electromagnetic waves to the activation means 10 when the latter is in a detection zone, therefore within range of emission of the activation module 1. The frame of electromagnetic waves can begin with a so-called wakeup portion for waking up the activation means 10.

In FIG. 2, there is shown a left lateral antenna G and a right lateral antenna D, respectively disposed in each of the front left and front right door handles, and a rear antenna A disposed in the rear zone at the level of the rear fender or of the rear trunk lock, of the vehicle 5.

Under the control of the activation module 1, the antennas G, D and A emit electromagnetic waves inducing an electromagnetic field defining an emission zone, respectively 10a, 10b, 10c. This is not limiting and there could be a single detection zone 10 as shown in FIG. 1 and a number other than three of emission zones.

The activation means 4 is identified as belonging to the vehicle 5, being for example recognizable by an identifier and is configured, on the one hand, to detect the presence of at least one of the antennas G, D and A and to measure the total amplitude of the electromagnetic field received, originating from at least one antenna and, on the other hand, to transmit the values thus measured to the activation module 1.

The function that might be involved in the activation may be the closing and/or the opening of an openable panel, for example a door or the trunk of the vehicle 5. The function may also be the starting of the vehicle 5. The entitled person carrying the activation means 4 may be situated outside or inside the automotive vehicle 5 when the activation is triggered, this depending on the function to be activated.

To control the activation, there can be detected a fixed position of the activation means 4 or the activation means 4 can follow a predetermined course by undergoing several detections.

In FIG. 2, the activation means 4 is not situated in any of the detection zones 10a, 10b, 10c, therefore out of range of emission of the activation module 1. It cannot therefore receive a frame of electromagnetic waves emitted Te by the activation module 1. On the other hand, a criminal has positioned an attack relay 2, 2a comprising an attack relay reception module 2 in the detection zone 10b at the rear of the automotive vehicle 5, this detection zone 10b possibly being other. This attack relay reception module 2 is therefore within range of emission of the activation module 1.

The attack relay 2, 2a also comprises an attack relay emission module 2a situated outside of the detection zone and receiving a frame of electromagnetic waves of the reception module 2 of the attack relay. The action of the attack relay 2, 2a therefore consists in receiving a frame of electromagnetic waves emitted Te by the activation module 1 and in retransmitting it to the activation means 4 in the form of a retransmitted frame of electromagnetic waves Tt.

The activation means 4 then situated outside of all the detection zones and therefore out of range of emission of the activation module 1, the attack relay 2, 2a must have a relatively high retransmission power.

There may be several activation means so as to ensure redundancy, this frequently being the case. In what follows, a single activation means will be mentioned but it may be that several activation means 4 are situated substantially at the same location, in which case all the activation means 4 can receive the frame of electromagnetic waves retransmitted Tt by the attack relay 2, 2a.

The activation means 4 receives a frame of electromagnetic waves retransmitted Tt by the attack relay 2, 2a. Not being able to differentiate whether this frame of electromagnetic waves originates directly from the activation module 1 or from an attack relay 2, 2a and not knowingly out of range of emission of the activation module 1, the activation means 4 operates just as for direct reception of a frame of electromagnetic waves emitted originating from the activation module 1.

The activation means 4 then re-emits a response frame of electromagnetic waves Tr to the activation module 1 for the activation of the function. The action of the attack relay 2, 2a has therefore culminated in the activation of the function present in the automotive vehicle 5.

To counter this action, an aspect of the invention proposes that there be performed an at least partial interception of a frame of electromagnetic waves retransmitted Tt by the attack relay 2, 2a in the direction of the activation means 4. This interception is advantageously independent of the activation means 4.

As the activation means 4 is out of range of emission of the activation module 1 and since the same holds, in a judicious manner, for the element operating the interception, for example a defense housing 3, it is deduced therefrom that a frame of electromagnetic waves which is similar to a frame of electromagnetic waves emitted Te by the activation module 1 and received by the defense housing 3 can originate only from an attack relay 2, 2a. This would not necessarily be the case if the element operating the interception were situated within range of emission of the activation module 1.

Thereafter, at least one at least partial destruction SP1, SP2 of the frame of electromagnetic waves retransmitted Tt from the attack relay 2, 2a to the activation means 4 and/or of the response frame of electromagnetic waves Tr emitted by the activation means 4 to the activation module 1 is performed, this or these destructions rendering the activation of the function inoperative.

In FIG. 2, the signals SP1 and SP2 destroy at least partially respectively the frame of electromagnetic waves retransmitted Tt from the attack relay 2, 2a to the activation means 4 and from the response frame of electromagnetic waves Tr departing from the activation means 4 toward the activation module 1.

In general, this can be performed by the defense housing 3 ensuring the interception of frames of electromagnetic waves and their differentiation, as also the emission of at least one at-least-partial-destruction signal SP1, SP2 when a frame of electromagnetic waves is recognized as originating from an attack relay 2, 2a, this being the case for a frame similar to a frame of electromagnetic waves emitted Te by the activation module 1 when the defense housing 3 is out of range of emission of the activation module 1.

This defense housing 3 may be portable and positioned remote from the automotive vehicle 5 outside of the detection zones and therefore out of range of emission of the activation module 1. Indeed, if the defense housing 3 is in operation in one of the detection zones, it may confuse the frame of electromagnetic waves emitted Te by the activation module 1 with a frame of electromagnetic waves retransmitted Tt by an attack relay 2, 2a.

To avoid this, at every start of the defense method, there can be performed a verification of a positioning of the defense housing 3 out of range of emission of the activation module 1.

So that there is always a response in reply to a frame of electromagnetic waves emitted Te by the activation module 1, it is therefore appropriate to render the defense housing 3 inoperative when present in one of the detection zones in proximity to the automotive vehicle 5 or to not allow it to enter one of the detection zones.

Thus, when the defense housing 3 is within range of emission of the activation module 1, the defense housing 3 can be deactivated by no longer emitting a destruction signal SP1, SP2.

If the defense housing 3 is not portable and fixed permanently, for example in a residence, it will not effectively protect against an attack relay 2, 2a unless it is sufficiently close to the activation means 4. This takes account of the emission power of the at-least-partial-destruction signal or signals SP1, SP2.

The interception of the retransmitted frame of electromagnetic waves Tt can be effected at the start of a frame so as to afford enough time to perform the destruction of one of the two frames of electromagnetic waves, retransmitted Tt or response Tr.

When the at least partial destruction SP1, SP2 is effected on the frame of electromagnetic waves retransmitted Tt to the activation means 4, this at least partial destruction SP1, SP2 pertains to an end portion of the retransmitted frame of electromagnetic waves Tt. Indeed the processing of the electromagnetic waves by the defense housing 3 imposes it, the at least partial destruction SP1 of the retransmitted frame of electromagnetic waves Tt having to be effected more rapidly than is the at least partial destruction SP2 of the response frame of electromagnetic waves Tr.

The defense housing 3 is therefore able to intercept at least partially a retransmitted frame of electromagnetic waves Tt and to emit a signal SP1, SP2 of at least partial destruction of a frame of electromagnetic waves retransmitted Tt to the activation means 4 and/or a response frame of electromagnetic waves Tr to the activation module 1.

The defense housing 3 can be independent of the activation means 4 and can emit the destruction signal SP1, SP2 in several directions, it being given that the relative positions of the defense housing 3 and of the activation means 4 can vary with respect to one another.

In a conventional manner, the frame of electromagnetic waves emitted Te by the activation module 1 and retransmitted Tt by the attack relay 2, 2a to the activation means 4 can be a frame of low-frequency waves and the response frame of electromagnetic waves Tr by the activation means 4 to the activation module 1 can be a frame of radiofrequency waves. The signal SP1, SP2 of at least partial destruction of a retransmitted frame of electromagnetic waves Tt and/or response frame of electromagnetic waves Tr can then be respectively low-frequency or radiofrequency.

By applying a partial destruction signal SP2 to the response frame of electromagnetic waves Tr originating from the activation means 4 toward the activation module 1, the defense housing 3 can jam this response frame Tr. The at least partial destruction SP2 of the response frame of electromagnetic waves Tr can cause more difficulty than the at least partial destruction SP1 of the frame of electromagnetic waves transmitted Tt by the attack relay.

It is preferred that the at least partial destruction SP2 is effected with several radiofrequency antennas which dispatch a divergent beam of destruction signals. It is also necessary to take into account that different receptions of frames of electromagnetic waves transmitted Tt are effected simultaneously on several activation means 4. In this case, the at least partial destruction SP2 is performed by diverse radiofrequency signals applied to each respective response frame of electromagnetic waves Tr of an activation means 4 and/or on each retransmitted frame of electromagnetic waves Tt. This can be effected by several radiofrequency antennas with different radiation patterns.

The at-least-partial-destruction signal or signals SP1, SP2 can be jamming signals interfering respectively with at least one portion of the retransmitted frame of electromagnetic waves Tt and/or of the response frame of electromagnetic waves Tr. For example these at-least-partial-destruction signals SP1, SP2 can be applied over dead times that the retransmitted frames of electromagnetic waves Tt and/or response frames of electromagnetic waves Tr contain. An example of signal jamming is disclosed in document FR-A-2 843 240, incorporated herein by reference.

An aspect of the present invention therefore relates to a defense housing 3 for defending against an attack relay 2, 2a. The defense housing 3 comprises means for receiving a frame of electromagnetic waves emitted Te by the activation module 1 and means for transmitting a frame of electromagnetic waves retransmitted Tt to the activation means 4. The defense housing 3 can undergo learning so as to be efficient only on an intercepted frame of electromagnetic waves that is similar to a frame of electromagnetic waves emitted by a specific activation module 1.

The defense housing 3 may indeed be adapted specifically for an activation module 1 of an automotive vehicle 5 which is itself specific. Accordingly, there is performed an initial step of learning of the defense housing 3 with respect to the activation module 1 present in a specific automotive vehicle 5.

The initial learning step consists in placing within range of emission of the activation module 1 the defense housing 3 in a mode of detection of frames of electromagnetic waves without at least partial destruction of the intercepted frames.

There is then undertaken the emission by the activation module 1 of a frame of electromagnetic waves emitted Te specific to this activation module 1. The defense housing 3 learns to recognize this frame of electromagnetic waves emitted Te as being specific to the activation module 1 and the defense housing 3 stores at least the start of this frame of electromagnetic waves emitted Te.

When the defense housing 3 is placed out of range of emission of the activation module 1, the at least partial destruction SP1, SP2 of an intercepted frame of electromagnetic waves at said at least one activation means 4 and/or of a response frame of electromagnetic waves Tr from said at least one activation means 4 to the activation module 1 is effected after comparison and similarity of the stored start of the frame of electromagnetic waves emitted Te by the activation module 1 with a start of the intercepted frame.

This can be effected upon a request for activation or deactivation of the function embedded aboard the automotive vehicle 5. The defense housing 3 will detect and record the start of the frame of electromagnetic waves emitted Te by the activation module 1 during this activation or deactivation, advantageously a low-frequency frame. The frame start will thereafter be used by the defense housing 3 as signature of the vehicle 5 to be protected.

For startup protection, in the case where there is no possibility of deactivating the defense housing 3, the person to whom the defense housing 3 and the activation means 4 belong can effect the same procedure as that mentioned previously but while having already activated the function, for example during startup with the defense housing 3 inside the cabin of the automotive vehicle 5.

To verify whether the learning is performed properly, this person can for example repeat an access or startup request with his defense housing 3 in the vehicle 5 or in proximity to the vehicle 5 and note that the function is no longer activated.

As a variant, for a "universal" defense housing which does not have in memory all the known protocols of all the systems, there can be performed a detection of start of response frame of electromagnetic waves of one or of each activation means, advantageously radiofrequency, to emit a parasitic signal in the frame currently being emitted. This function of detection of response of the or of each activation means followed by a destruction of the frame will of course be activated only after the reception of a start of retransmitted frame of electromagnetic waves, advantageously low-frequency, and for a maximum time which corresponds to the longest protocol, for example 200 ms to 300 ms.

Another simpler destruction possibility is to dispatch a periodic pulse which will destroy all response frame of the activation means, advantageously radiofrequency, of duration greater than the period of the destructive signal for a time which will cover the response window of the one or more activation means.

The defense housing 3 also exhibits at least one antenna for receiving the frame of electromagnetic waves retransmitted Tt by an attack relay 2, 2a. The defense housing 3 exhibits means for generating at least one at-least-partial-destruction signal SP1, SP2.

There may be one or more antennas for emitting a signal SP1, SP2 of at least partial destruction of the frame of electromagnetic waves retransmitted Tt to the activation means 4 and/or of the response frame of electromagnetic waves Tr by the activation means 4 toward the activation module 1.

For example, there may be one or more antennas for emitting a low-frequency at-least-partial-destruction signal SP1 for the retransmitted frame of electromagnetic waves Tt and/or several antennas for emitting a radiofrequency at-least-partial-destruction signal SP2 for the response frame of electromagnetic waves Tr. Other combinations are also possible.

The antennas for emitting one and the same type of destruction signal SP1, SP2 may exhibit complementary emission zones surrounding the defense housing 3 so as to cover the whole environment of the defense housing 3 and so that the at-least-partial-destruction signals SP1, SP2 reach the retransmitted frame of electromagnetic waves Tt originating from the attack relay 2, 2a to the or each activation means 4 or the response frame of electromagnetic waves Tr originating from the or each activation means 4 to the activation module 1.

An aspect of the present invention also relates to an assembly of an automotive vehicle 5 and of at least one activation means 4. In general, when selling the automotive vehicle, four identical activation means 4 can be provided so as to ensure redundancy. According to an aspect of the present invention, the assembly comprises a defense housing 3 such as described previously to protect against criminal activation of a function present in the automotive vehicle.

The invention claimed is:

1. A method of defense against an attack relay action on a remote activation of a function present in an automotive vehicle, the activation being effected between at least one activation means belonging to a person entitled to operate this activation and an activation module present in the vehicle by emission and reception of electromagnetic waves between said at least one activation means and the activation module, the attack relay action comprising receiving a frame of electromagnetic waves emitted by the activation module and retransmitting it to said at least one activation means then being in a zone out of range of emission of the activation module, said at least one activation means, after reception of a frame of electromagnetic waves retransmitted by the attack relay, then re-emitting a response frame of electromagnetic waves toward the activation module for the activation of the function, the method comprising:

performing by a defense housing, in a zone out of range of emission of the activation module, an at least partial interception of the frame of electromagnetic waves retransmitted from the attack relay in the direction of said at least one activation means, an at least partial destruction of the frame of electromagnetic waves retransmitted to said at least one activation means and/or of the response frame of electromagnetic waves of said at least one activation means toward the activation module, this destruction rendering the activation of the function inoperative, and performing at every start of the defense method, a verification of a positioning of the defense housing out of range of the activation module, the defense housing being rendered inoperative when present in one of the detection zones in proximity to the vehicle.

2. The method as claimed in claim 1, wherein the interception of the retransmitted frame of electromagnetic waves is effected at the start of a frame.

3. The method as claimed in claim 2, wherein, when the at least partial destruction is effected on the frame of electromagnetic waves retransmitted to said at least one activation means, this at least partial destruction pertains to an end portion of the retransmitted frame of electromagnetic waves.

4. The method as claimed in claim 1, wherein the at least partial reception of a retransmitted frame of electromagnetic waves is effected by a defense housing with emission by the housing of at least one signal of at least partial destruction of a retransmitted frame of electromagnetic waves and/or response frame of electromagnetic waves.

5. The method as claimed in claim 4, wherein the defense housing is independent of said at least one activation means and emits a divergent beam of signals of at least partial destruction on the response frame of electromagnetic waves.

6. The method as claimed in claim 4, wherein the frame of electromagnetic waves emitted by the activation module and the frame of electromagnetic waves retransmitted by the attack relay toward said at least one activation means are frames of low-frequency waves and the frame of electromagnetic waves of response by said at least one activation means toward the activation module is a frame of radiofrequency waves, said at least one signal of at least partial destruction of a retransmitted frame of electromagnetic waves and/or response frame of electromagnetic waves being respectively low-frequency or radiofrequency.

7. The method as claimed in claim 6, wherein said at least one destruction signal is a jamming signal interfering respectively with at least one portion of the retransmitted frame of electromagnetic waves and/or of the response frame of electromagnetic waves.

8. The method as claimed in claim 4, wherein the defense housing is mobile and when the defense housing is placed within range of emission of the activation module, the defense housing is deactivated by no longer emitting a destruction signal.

9. The method as claimed in claim 4, wherein there is performed an initial step of learning of the defense housing with respect to the activation module present in a specific automotive vehicle, this initial step consisting in placing within range of emission of the activation module the defense housing in a mode of detection of frames of electromagnetic waves without at least partial destruction of the intercepted frames, in making the activation module emit an emitted frame of electromagnetic waves specific to this activation module, in making the defense housing recognize this emitted frame of electromagnetic waves as being specific to the activation module and in making the defense housing store at least the start of this emitted frame of electromagnetic waves and, when the defense housing is placed out of range of emission of the activation module, the at least partial destruction of an intercepted frame of electromagnetic waves at said at least one activation means and/or of a response frame of electromagnetic waves of said at least one activation means toward the activation module is effected after comparison and similarity of the stored start of the frame of electromagnetic waves emitted by the activation module with a start of the intercepted frame.

10. The method as claimed in claim 9, wherein there is thereafter performed a verification of a positioning of the defense housing out of range of emission of the activation module at the start of the defense method.

11. A defense housing for defending against an attack relay of an automotive vehicle, the attack relay exhibiting means for receiving a frame of electromagnetic waves emitted by an activation module and means for transmitting a retransmitted frame of electromagnetic waves toward at least one activation means, wherein it implements a method comprising: performing by the defense housing, in a zone out of range of emission of the activation module, an at least partial interception of the frame of electromagnetic waves retransmitted from the attack relay in the direction of said at least one activation means, an at least partial destruction of the frame of electromagnetic waves retransmitted to said at least one activation means and/or of the response frame of electromagnetic waves of said at least one activation means toward the activation module, this destruction rendering the activation of the function inoperative, and performing at every start of the method, a verification of a positioning of the defense housing out of range of the activation module, the defense housing being rendered inoperative when present in one of the detection zones in proximity to the vehicle, the defense housing comprising:

- at least one antenna configured to receive the frame of electromagnetic waves retransmitted by the attack relay,
- means configured to generate at least one at-least-partial-destruction signal and
- at least one antenna configured to emit the signal of at least partial destruction of the frame of electromagnetic waves retransmitted to said at least one activation means and/or of the frame of electromagnetic waves of response by said at least one activation means toward the activation module.

12. An assembly of the automotive vehicle and of the at least one activation means, comprising the defense housing as claimed in claim 11.

13. The method as claimed in claim 5, wherein the frame of electromagnetic waves emitted by the activation module and the frame of electromagnetic waves retransmitted by the attack relay toward said at least one activation means are frames of low-frequency waves and the frame of electromagnetic waves of response by said at least one activation means toward the activation module is a frame of radiofrequency waves, said at least one signal of at least partial destruction of a retransmitted frame of electromagnetic waves and/or response frame of electromagnetic waves being respectively low-frequency or radiofrequency.

* * * * *